United States Patent [19]

Olschewski et al.

[11] Patent Number: 4,689,982

[45] Date of Patent: Sep. 1, 1987

[54] METHOD FOR MAKING A CAGE AND THE CAGE PRODUCED THEREBY

[75] Inventors: Armin Olschewski, Schweinfurt; Hermann Hetterich, Heidenfeld; Peter Horling, Mainberg; Robert Stolz, Schweinfurt, all of Fed. Rep. of Germany

[73] Assignee: SKF GmbH, Schweinfurt, Schweinfurt, Fed. Rep. of Germany

[21] Appl. No.: 795,824

[22] Filed: Nov. 7, 1985

[30] Foreign Application Priority Data

Nov. 9, 1984 [DE] Fed. Rep. of Germany ....... 3440962

[51] Int. Cl.$^4$ .............................................. B21D 53/12
[52] U.S. Cl. .................................. 72/334; 29/148.4 C
[58] Field of Search .................. 29/148.4 C, DIG. 49; 72/334, 379

[56] References Cited

U.S. PATENT DOCUMENTS

| | | | |
|---|---|---|---|
| 1,645,866 | 10/1927 | Lothrop | 29/148.4 C |
| 2,774,132 | 12/1956 | Squire | 29/148.4 C |
| 4,505,608 | 3/1985 | Haldric | 72/379 |

FOREIGN PATENT DOCUMENTS

| | | | |
|---|---|---|---|
| 597907 | 6/1934 | Fed. Rep. of Germany | 72/379 |
| 28087 | 3/1977 | Japan | 72/334 |
| 22682 | 3/1978 | Japan | 72/333 |

Primary Examiner—Lowell A. Larson
Attorney, Agent, or Firm—Eugene E. Renz, Jr.

[57] ABSTRACT

A method for producing a cage, especially a roller cage of sheet material by punching out the roller element pockets, consisting of the steps of stamping the sheet material in the direction of the sheet thickness in at least predetermined areas of the punching line for forming the rolling element pockets and thereafter forming the pockets by a punching operation.

1 Claim, 9 Drawing Figures

_4,689,982_

METHOD FOR MAKING A CAGE AND THE CAGE PRODUCED THEREBY

FIELD OF THE INVENTION

The present invention relates to method for making cages for rolling bearings and particularly to manufacture of cages made from sheet materials.

BACKGROUND OF THE INVENTION

West German Offenlegungsschrift No. 1,931,180 discloses a method for making cages for rolling bearings and in accordance with the method disclosed therein, the rolling element pockets are punched out by means of an appropriate die from a strip of sheet metal or the like. In a subsequent processing step, the axially extending surfaces of the cross pieces defining the rolling element pockets are bevelled by stamping with a die to adjust the width of the pocket to the desired dimensions. The stamping operation produces compaction and densification of the material and, hence, the danger of cracking or fissures developing in this area is relatively small. The corner regions of the pockets, however, are relatively sensitive points resulting from the bending stress which occurs when the strip material is formed into a ring-shaped cage and when the cage is under load during operation in a roller bearing. These areas, thus, tend to develop cracks or fissures which can lead to failure of the cage. Even if the cage does not fail, it has been found that the cage will be distorted by internal stresses which produces failure of the roller bearing.

In accordance with another known process disclosed in West German Pat. No. 1,066,978, the surfaces of the pocket defining the contact areas are also densified when the dimensions of the pockets are calibrated. In this instance, it is necessary to apply pressure on the contact surfaces by means of a wedge-shaped die to expand the rolling element pocket. Here again, even though the contact surfaces for the rolling elements according to this process acquires a surface which meets high expectations and which is not subject to the danger of cracking, the material of the cage in the corner area of the pockets is subjected to considerable stretching. Because the structure is relatively weak, the formation of cracks and fissures is, therefore, predestined.

SUMMARY OF THE INVENTION

With the foregoing in mind, it is an object of the present invention to provide a method for making cages for roller bearings free of cracks and fissures, particularly in the pocket side corner areas and which are not subject to the danger of cracking and failure during operation. To this end, the sheet material from which the cage is formed is stamped at least in those predetermined areas wherein subsequently the material is severed or cut to form the rolling element pockets by a punching operation. This stamping is preferably done in the corner areas of what is later to form the rolling element pockets. Thus during the stamping process, the section of material in question, that is the corner areas of the pockets is stamped through and/or densified. It has been found, for example, that only stamping the material through by, for example, an amount equal to half the thickness of the sheet strengthens the pocket area in question by the extent of the stamping done. Thus in this stamped area, the sheet material has the strength of a correspondingly thicker sheet material and in this way, therefore, the danger of cracking or developing fissures is virtually eliminated.

In accordance with a further variant of the method of the present invention, the sheet material in the area of the pockets is densified and this can also be done from both sides. The densification results in cold strengthening or working of the sheet material which is equivalent to hardening. Thus cracking under normal loads is avoided. After the hardening step, the pockets are punched out in a known fashion. The result is that in the case of sheet material which has been densified in the area of the punching line, the periphery of the pocket is formed without burrs and is of a superior finish providing a good contact surface for the rolling elements.

BRIEF DESCRIPTION OF THE DRAWINGS

These and other objects of the present invention and the various features and details of the method and the cage produced thereby are hereinafter more fully set forth with reference to the accompanying drawings which show the area of the rolling element pocket and essentially tubular not yet finished blank for cylindrical rollers after the stamping step, and wherein.

DESCRIPTION OF THE PREFERRED EMBODIMENTS

Figure 1:
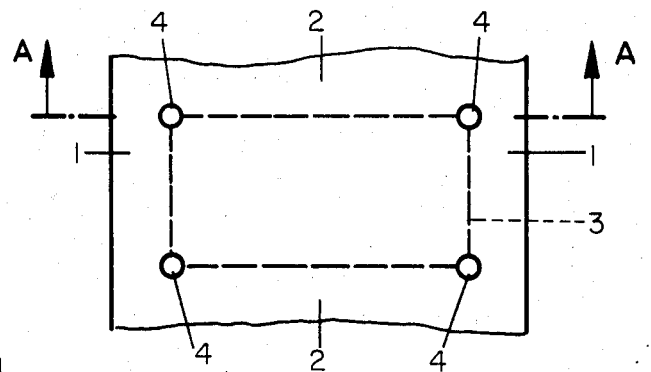
FIG. 1 is a top plan view of a cage blank with stamped-through areas in the corners of what is later to become the rolling element pockets.

Referring now to the drawings, each of the views shows the pocket area of a segment of the cage for cylindrical rollers. The cage can be formed either from a tubular section or from a flat strip which is then rolled into an annular shape. As illustrated, the pockets of the finished cage are bounded by two circumferentially extending side ring sections 1 and a plurality of circumferentially spaced cross pieces 2.

Figure 2:
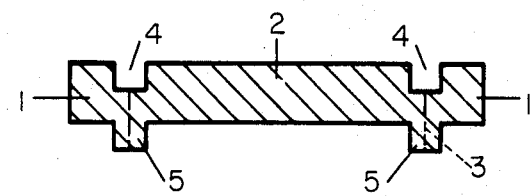
FIG. 2 is a longitudinal, sectional view taken along line A—A of the cage blank of FIG. 1.
Figure 3:
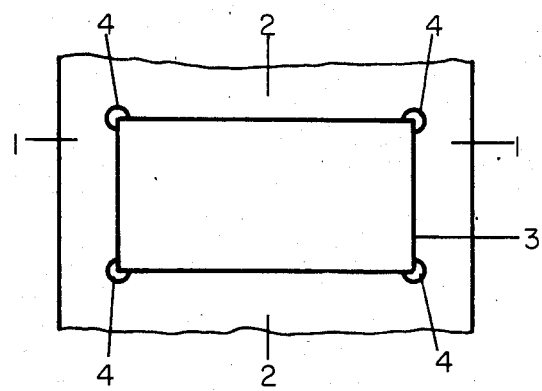
FIG. 3 is a top plan view of the cage according to FIGS. 1 and 2 with a finished pocket.

Referring now more specifically to the drawings, and particularly to FIGS. 1, 2 and 3 thereof, there is illustrated one embodiment in accordance with the present invention. As shown therein, in the process of forming the cage pocket, the sheet is stamped radially or in the direction of the sheet thickness at the four corner locations of the generally rectangular pocket before formation of the pockets along the punch line 3. Note that about one-half the sheet thickness is stamped through. In accordance with this embodiment, round, blind holes 4 are formed on the upper face of the sheet and four pin-like projections 5 are obtained on the reverse side of the sheet. Stamping in this fashion increases the strength in the corner areas of the pocket to be formed. Thereafter, in a subsequent processing step, the pockets are punched out along the broken lines 3 shown in FIGS. 1 and 2.

As illustrated in FIG. 3, the finished, punched pocket 3a is bounded by the punch line 3. In the present instance, the boundary lines of the cage pockets are truly straight and at right angles to each other and intersect at the center line of the pin-like projections 5 or blind holes 4. Alternatively, the punch for forming the pockets can be rounded in the corner areas if desired.

Figure 4:
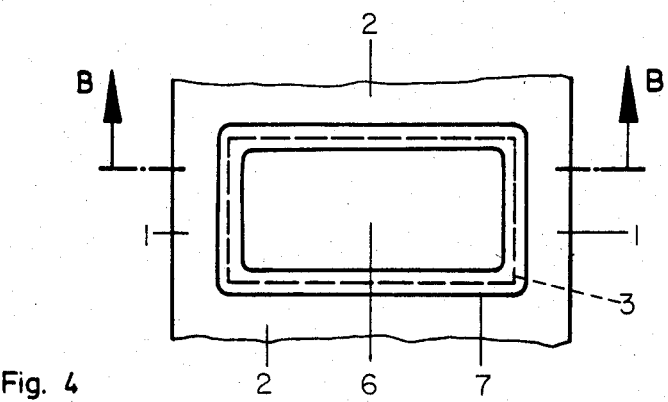
FIG. 4 is a top plan view of a cage blank with a stamped-through section extending over the entire area of the rolling element pocket.
Figure 5:
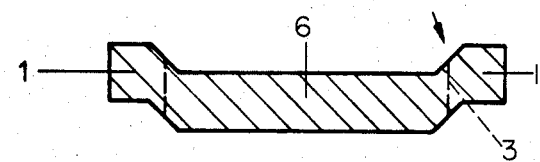
FIG. 5 is a longitudinal, sectional view taken along lines B—B of the cage blank according to FIG. 4.

FIGS. 4 and 5 illustrate another method for forming the pockets of a cage for roller bearing in accordance with the present invention. In this instance, a generally rectangular section conforming to the final configuration of the cage pocket extending over the entire area later to become the pocket is stamped through. In the final phase of stamping, the material in the transition zone to the stamped-through section 6 becomes densified or work hardened. Thereafter, when the pockets are punched through, the punch line 3 passes through the transition zone 7, that is in the area where the material has been strengthened.

Figure 6:
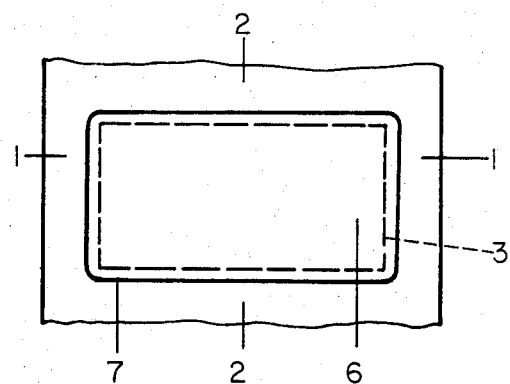
FIG. 6 is a top plan view of a cage blank with an area which has been densified along the punching line.
Figure 7:
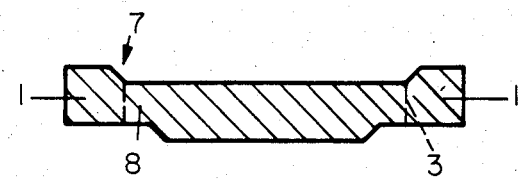
FIG. 7 is a longitudinal, sectional view taken along line C—C of the cage blank according to FIG. 6.

FIGS. 6 and 7 show a further modification of the method in accordance with the present invention for forming a cage pocket. In this instance, a section 6 corresponding to the entire cage pocket is again stamped out. However, in contrast to the process according to that illustrated in FIGS. 4 and 5, the transition zone 7 is wider whereby a more strongly densified section 8 is obtained. Here again, the cage pocket is punched out along the punch line 3 illustrated in broken lines. Typically, the pocket is punched from the upper surface along the broken line 3. Moreover, it has been found that the degree of burr formation can be reduced with particular effectiveness by punching out the pockets in a direction opposite to that of the stamping. Thus, in accordance with the FIG. 7 arrangement, the pocket punching operation would be performed from the inner side or the underneath side.

Figure 8:
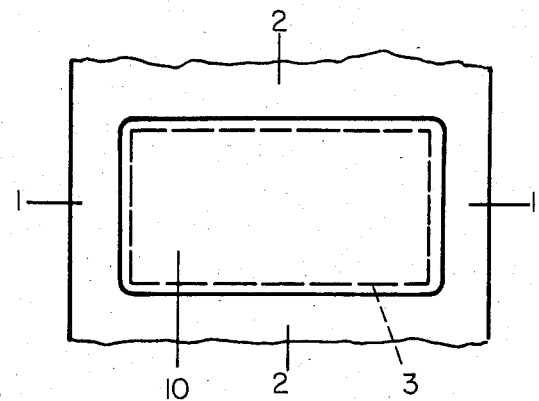
FIG. 8 is a top plan view of a cage blank with a pocket area which has been densified from both sides of the blank.
Figure 9:
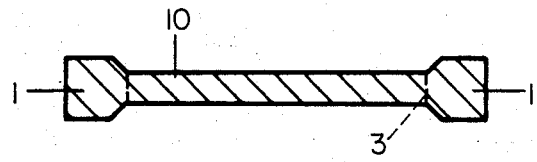
FIG. 9 is a longitudinal, sectional view taken along lines D—D of the cage blank according to FIG. 8.

Referring now to FIGS. 8 and 9, there is shown an alternate method in accordance with the present invention for forming cage pockets. In this instance, the sheet material is stamped from both sides in the area of the cage pocket to be formed. In this instance, the entire pocket area is densified from both sides whereby an area of increased material densification 10 is obtained which extends over the entire pocket. In this instance, the pocket is punched out along the broken lines 3 in the densified area.

Even though particular methods for forming cages in accordance with the present invention have been illustrated and described herein, it is not intended to limit the invention and changes and modifications may be made therein within the scope of the following claims.

SUMMARY

In the production of cages from sheet material or the like, the area along the punching line where punching is to occur subsequently is stamped through or densified before the rolling element pockets are punched out. In this way, the sheet material becomes strengthened or densified in this structure. The danger of cracking, especially in the corner areas of the rolling element pocket, is thus considerably reduced.

What is claimed is:

1. A method for producing a cage, especially a roller cage of sheet material by punching out the roller element pockets of a predetermined shape having corner areas, consisting of the steps of localized stamping the sheet material in the direction of the sheet thickness in the corner areas only to provide a densified transition zone in said corner areas only and thereafter forming the pockets by a punching operation through the transition zone.

* * * * *